Dec. 6, 1960  J. H. BENNETT  2,963,313
TRAVEL TRAILER
Filed May 22, 1959  3 Sheets-Sheet 1
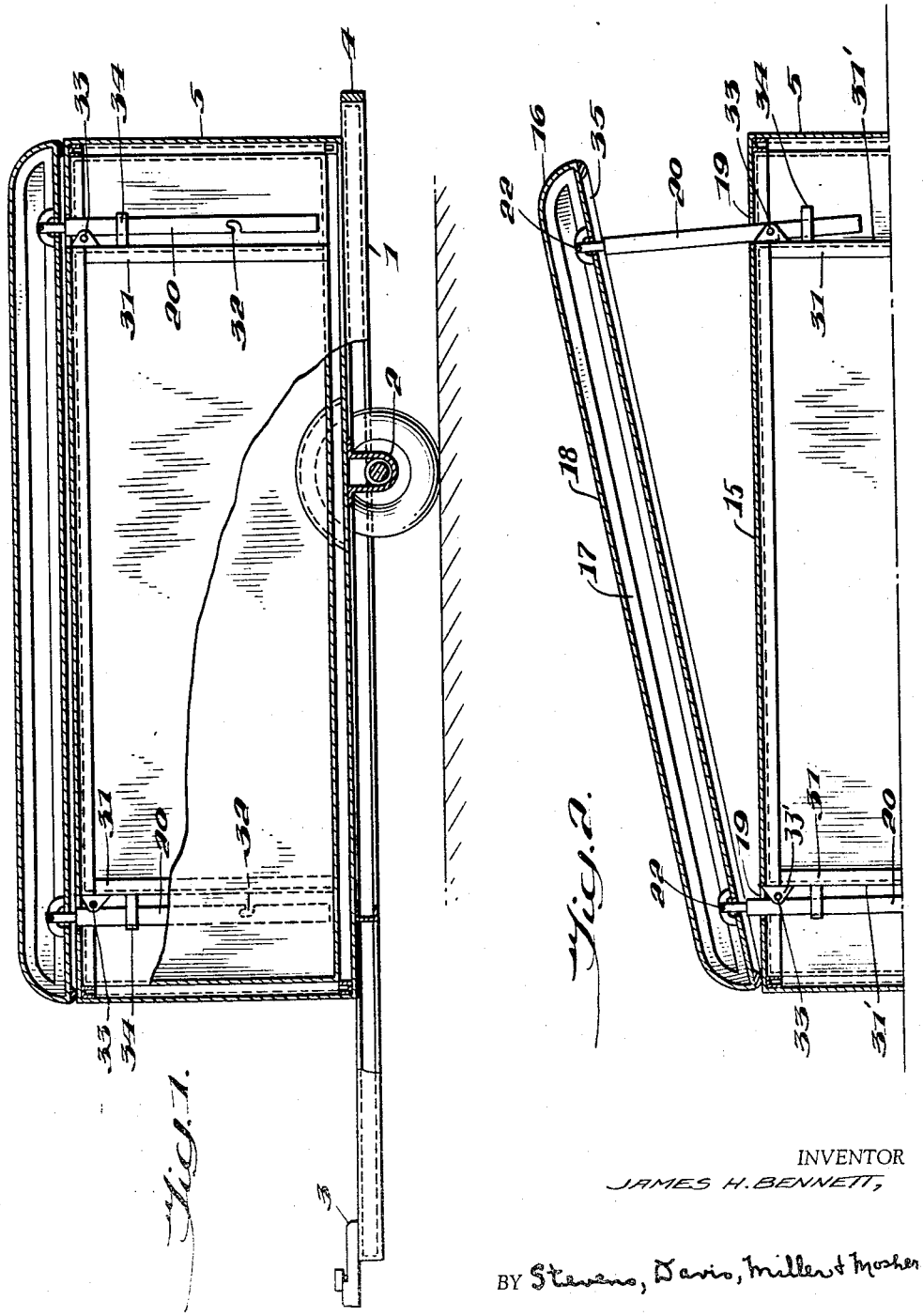
INVENTOR
JAMES H. BENNETT,
BY Stevens, Davis, Miller & Mosher
ATTORNEYS Dec. 6, 1960  J. H. BENNETT  2,963,313
TRAVEL TRAILER
Filed May 22, 1959  3 Sheets-Sheet 2
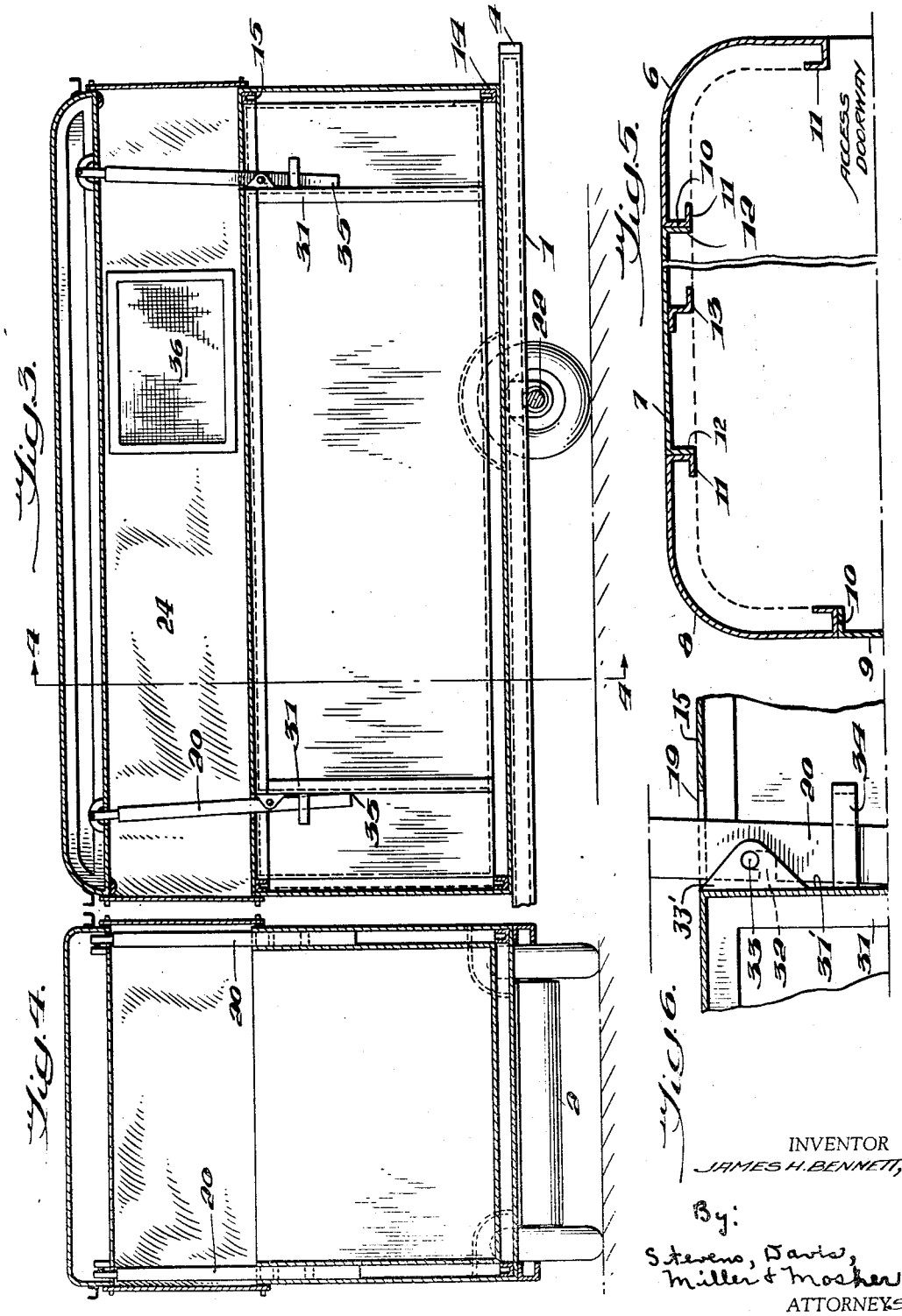
INVENTOR
JAMES H. BENNETT,
By:
Stevens, Davis,
Miller & Mosher
ATTORNEYS

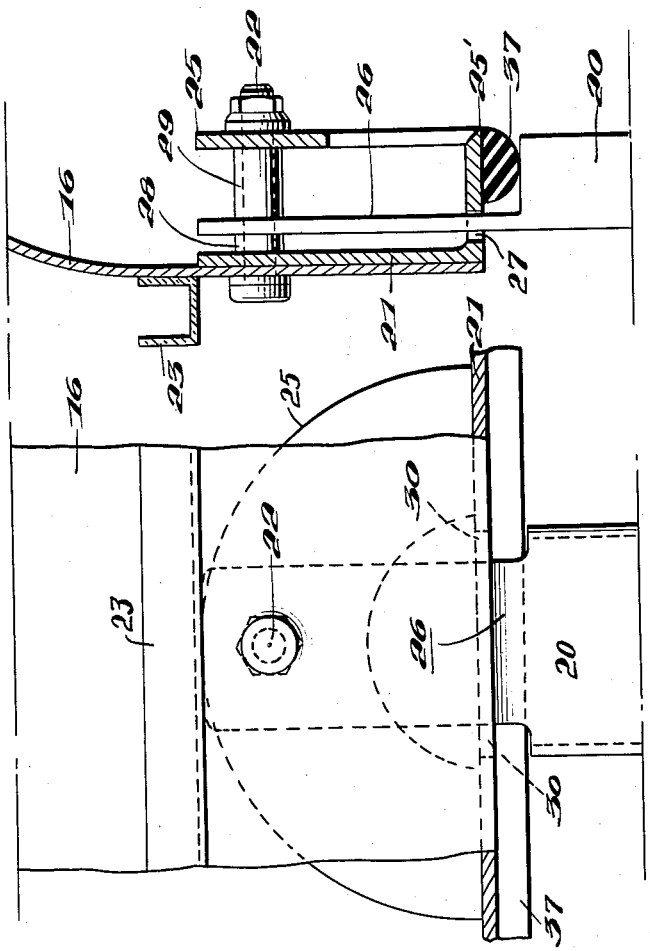
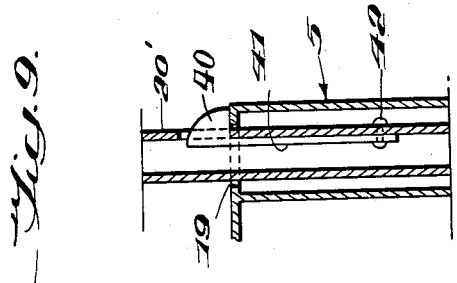

United States Patent Office 2,963,313
Patented Dec. 6, 1960

2,963,313

TRAVEL TRAILER

James H. Bennett, Rte. 6, Box 70E, Towson 4, Md.

Filed May 22, 1959, Ser. No. 815,034

10 Claims. (Cl. 296—26)

This invention relates to a travel trailer adapted to be towed behind an ordinary automobile but more particularly to the method and means of supporting and stabilizing an extensible cover for the trailer.

It is well known that the conventional trailer, having normal headroom, is difficult to tow behind a conventional passenger automobile because of the exposed frontal area offering a large resistance to wind, and cross winds on the side area cause side sway of the trailer. Clam shell and collapsible trailers are known but none are known to have a cover that can be raised to a position by one person without jacks or other devices to afford adequate headroom that will achieve the structural stability afforded by the construction of this invention.

It is an object of this invention to provide a miniature travel trailer of compact design which can be readily towed behind a passenger automobile or even a sports car because of its lightweight construction and low wind resistance.

Another object of the invention is to provide a trailer having an extensible hard-top construction which has supports capable of stabilizing the hard-top construction against normal use and wind loads when in the extended, full headroom position.

It is the further object of this invention to provide a miniature travel trailer having a hard-top construction which is readily raised into place by one person and further secured against weather by a snap-on, weatherproof side curtain.

Further objects become apparent from the description of the accompanying drawings in which like numerals refer to like parts. In the drawings:

Figure 1 is a side sectional view of the trailer of this invention with the hard-top cover in the closed position.

Figure 2 is a fragmentary view similar to Figure 1 showing one end of the cover elevated with the strut in the latched position.

Figure 3 is a side elevational view showing the hard top cover elevated, front and rear, and latched in the up position.

Figure 4 is a cross-sectional view through the trailer taken on the line 4—4 of Figure 3.

Figure 5 is a horizontal sectional view through a portion of the trailer body showing details of the side panel construction.

Figure 6 is an enlarged fragmentary view of the latch detail.

Figure 7 is an enlarged fragmentary view of the side elevation of the upper strut pivot shown in Figure 6.

Figure 8 is an enlarged fragmentary sectional view through the edge of the cover showing the upper strut pivot.

Figure 9 is an enlarged fragmentary view of an alternate form of latch construction.

The trailer shown in Figure 1 is mounted upon a trailer chassis 1 having spring wheel suspension 2. The chassis extends all the way from trailer hitch 3 in the front, to bumper 4 in the rear. Wheel suspension 2 is located with respect to trailer body 5 with due regard being given to weight distribution of the standard equipment in the trailer for balance, so that it will trail well behind a conventional automobile or a lightweight sports car. The trailer chassis 1 is made of conventional angle or channel iron and of welded construction. Trailer body 5 is formed of panels 6, 7, 8 and 9 as illustrated in Figure 5 in which the vertical abutting edges 10 of the sheets forming side panels 6—9 are bent inwardly to form reinforcing channels 11 or flanges 12. Abutting flanges 12 are spot welded together so that the assemblage of panels presents a smooth and continuous exterior. Additional Z members 13 may be spot welded to panels 6—9 where additional strength or fastening surface is desired. Side panels 6—9 are secured to channels 14 or other suitable members secured to chassis 1. The tops of the panels 6—9 are suitably finished by flanges or channels 15 forming a top edge.

A hard-top cover 16 is contoured to conform with the plan form of trailer 5 and also contoured for minimum wind resistance from the front and sides. It may be a framework 17 covered with contoured sheet material 18, i.e. canvas or plastic, or it may be a reinforced molded plastic or of fiberglass reinforced plastic construction, or it can be made of any suitable material that lends itself to contouring, and that is lightweight and has suitable structural characteristics.

The body of trailer 5 at front and rear has sets of apertures 19 in top edge structure 15 to accommodate the struts 20 that support the hard-top 16. The struts 20 are shown (see Figures 7 and 8) pivotally supported on an angular reinforcing member 21 mounted in and extending throughout the internal periphery of the hard-top construction 16 at about one third the height of the top, however, pivots 22 can be located anywhere between the bottom and the top of cover member 16 but greater stability is achieved if pivots 22 are located well within cover member 16.

Figures 7 and 8 also show a gutter channel 23 secured around top 16 to prevent rain water from leaking in at the top of the side curtain 24. On angular reinforcing member 21 which forms the inside bottom edge of cover member 16 is mounted a support 25 welded at 25' to member 21 to form a bracket 21, 25 for the support of each pivot 22. The end of strut 20 is formed with a tongue 26 extending through a slot 27. A bolt and nut form pivot 22 to secure the upper end of strut 20 to cover assembly 16. Sleeves 28 and 29 on pivot 22 hold the upper end of strut 20 and the sides of bracket 21, 25 in proper spaced relation. Clearances 30 fore and aft and in slot 27 at the side of tongue 26 of strut 20 are quite close to preclude side sway and afford greater rigidity.

It will also be noted that in Figures 1 to 3 and 6 the vertical reinforcing members or frames 31 in the sidewall construction of the trailer, extend with their flat sides 31' aligned with the inner edges of slot 19 formed in the top of the trailer body edge. In Figures 1 and 2 it will be noted that there is sufficient clearance on the outer edges of the slots 19 in the trailer body so that struts 20 will hang straight downwardly from pivots 22. Struts 20 are formed with L-shaped slots 32 spaced upwardly from the lower end of each strut. Near the top of the trailer body on vertical member 31 is provided a flange or a bracket 33' carrying a transverse pin 33 over which slot 32 in the lower end of the strut will slide and engage when the strut is in the elevated position. A guide member 34 may be secured to vertical frame member 31 to reinforce the lower end of the strut when in raised position, for additional lateral stability.

A seal 37 is secured to the underside of cover member 16 to seal space between cover 16 and trailer body member 5 when in a closed position.

Suitable latches (not shown) similar to a trunk or suitcase latch are mounted forward and rearwardly on each side which hold the cover down in sealed position for security and against weather.

To raise the top into operative position, it is merely necessary to lift cover 16 from one end as shown in Figure 2. Struts 20, by reason of gravity bias, pivot forwardly in the clearance provided in the slots in the cover 16 as cover 16 is raised, and rearwardly away from the vertical support members 31 into the clearance space within the shell of the body of the trailer. Sufficient clearance is provided at the upper edge of the trailer by slot 19 to permit strut 20 to be raised and pivoted. When cover 16 is raised to a sufficient height, slot 32 in the strut will drop over pin 33 and secure strut 20 for pivoting as the front on opposite edge of the cover is raised.

The front edge of the cover is raised in a similar manner. It will be noted that the clearance forwardly of the strut in slot 19 permits the cover to be raised without binding. As the forward struts are raised to the position shown in Figure 3, the clearances of slots 19 and 27 through which the strut extends, permits the forward pivoting of the struts 20 with respect to the top 16, until the slot 32 engages pin 33. It will be noted then that when the four struts are in the position shown in Figure 3, the inward slope of the strut by reason of the L-shaped slot 32 and location of pins 33 cause the lower ends of struts 20 to lay firmly against vertical structures 31 at 35 within the body of trailer 5 so that good fore and aft stability is provided. In other words, a wind load on top cover 16 causes very little displacement fore and aft. Likewise the close fit of the strut portion 26 in the slot 27 in the cover 16 and the bracket members 34 located below the pin provide for lateral stability, against side wind load on the top 16.

When the top is raised in the position such as shown in Figure 3, a flexible side curtain 24 is snapped on with conventional fittings to completely surround elevated top 16. Side curtain 24 may have one or more glazed or screened apertures 36 for light and ventilation. Side curtain 24 will extend from one side of the access doorway (Figure 5) around the trailer between the top and bottom sections in one or more pieces, to the other side of the access doorway.

The number and type of apertures in the side curtain construction will depend upon whether the trailer is to be used for domestic use, that is hunting, camping and vacation purposes or whether it will be used as a field office, concession stand or sales demonstration booth. The interior arrangement of the trailer can fit any one of a number of purposes.

The latch of Figure 9 shows an alternate construction wherein a catch 40 mounted on a leaf spring 41 is riveted on the inside of strut 20' by rivet 42 which struts extend through slots 19 in the top edge of trailer body 5. As struts 20' are raised, catches 40 are depressed within struts 20' until they snap out when catch 40 is over the top side of the trailer side. The fore and aft stability is obtained by the position of strut 20' with respect to the vertical brace member 31 in the trailer body and the lateral stability is achieved as previously described through guide member 34 and the close tolerance of the slot around the strut.

Having described above the preferred embodiment of my trailer, it is to be understood that certain changes, alterations and substitutions can be made within the spirit and scope of the appended claims.

What is claimed is:

1. In a trailer of the type described, comprising a trailer body having side panels forming a box-like housing, mounted on a wheeled chassis, a rigid cover member contoured in plan form to be coextensive with the plan form of said box-like housing, and further contoured to afford minimum wind resistance from front and cross winds as the trailer is towed behind an automobile, the total height of the cover member and trailer body being substantially less than the height required for a person to stand upright in said trailer, means to erect, support and stabilize said cover member over said trailer body comprising forwardly and rearwardly located pairs of struts rigid throughout their length, each of said rigid struts depending through a slot formed in the lower edge of said cover member from pivot mounting means within said cover member, the lower free end of each said strut extending freely and slidably through a slot in the top edge of a side of said trailer body, vertical reinforcing members secured to said side panels of said trailer body adjacent each said strut, said vertical reinforcing members being disposed on opposite sides of the forwardly and rearwardly positioned pairs of struts, latch means positioned on said struts spaced from the ends thereof and formed to cooperate with other latch means adjacent the top edge of said trailer body below said last mentioned slots, the ends of said struts when said struts are latched to said trailer body resting firmly against said vertical reinforcing members to afford fore and aft stability.

2. The device as set forth in claim 1, wherein said vertical reinforcing members are substantially the same lateral dimension as said struts, and guide members secured to said vertical reinforcing members extending fore and aft of each said strut to afford lateral stability for said strut.

3. The device as set forth in claim 1, wherein said cover member comprises a formed, rigid top member having an angle reinforcing member surrounding the periphery thereof, said slots being formed in said angle member through which said struts extend, said pivot means interconnecting said angle member and said struts.

4. The device as set forth in claim 1 wherein said latch means on each said strut comprises an L-shaped slot, opening from the side of said strut adjacent said vertical reinforcing member, and said latch means on said trailer body consisting of transverse pin means spaced from said vertical reinforcing member a distance greater than the distance from the side of said strut to the center of the portion of said L-shaped slot that is parallel to the side of said strut.

5. In a trailer of the type described, comprising a trailer body having side panels forming a box-like housing, mounted on a wheeled chassis, a rigid cover member contoured in plan form to be coextensive with the plan form of said box-like housing, and further contoured to afford minimum wind resistance from front and cross winds as the trailer is towed behind an automobile, the total height of the cover member and trailer body being substantially less than the height required for a person to stand upright in said trailer, means to erect, support and stabilize said cover member over said trailer body comprising forwardly and rearwardly located pairs of struts rigid throughout their length, each of said rigid struts depending through a slot formed in the lower edge of said cover member from pivot mounting means within said cover member, the lower free end of each said strut extending freely and slidably through a slot in the top edge of a side of said trailer body, vertical reinforcing members secured to said side panels of said trailer body adjacent each said strut, said vertical reinforcing members being disposed on opposite sides of the forwardly and rearwardly positioned pairs of struts, latch means positioned on said struts spaced from the ends thereof and formed to cooperate with other latch means adjacent the top edge of said trailer body and said last mentioned slots, the ends of said struts when said struts are latched to said trailer body resting firmly against said vertical reinforcing members to afford fore and aft stability.

6. The vehicle as set forth in claim 5, wherein sealing means is mounted on the lower edge of the rigid cover member and is effective to engage the top edge of the trailer side wall structure when said cover is in lowered closed position on said side wall structure.

7. The device as set forth in claim 5 wherein said strut-carried latch means consists of a spring-loaded catch, said other latch means comprising the top edge of said trailer body and which is engaged by said strut-carried latch means to hold said strut in the extended position.

8. In a vehicle of the type described, a wheel supported generally box-like trailer body comprising, wall structure defining the sides of said trailer body, a substantially rigid top member of a size to conform to the size in plan of the body formed by said wall structure and contoured to afford minimum wind resistance, pivotal mounting means disposed on opposite sides of said top member and spaced apart so as to be disposed toward the ends of said body sides, a rigid, unitary and freely depending strut member pivoted at its upper end on each said mounting means, latch means disposed on each strut member intermediate its pivoted and depending free ends, said trailer body wall structure having vertically extending flange-like reinforcing members disposed adjacent said strut member, other latch means mounted on said reinforcing members adjacent the top of said trailer body wall structure operative to cooperate with said strut-carried latch means, said strut-carried latch means being biased into engagement with said other latch means disposed toward one side of said trailer body as the rigid top member at said one side is tilted upward away from said trailer body side, the inter-engaged latch means at said one body side constituting pivot means for said rigid cover as the other side of said cover is raised to effect inter-engagement of the latch means at the side opposite said first-mentioned body side, the said flange-like body-reinforcing members constituting abutment means for the free ends of said strut members to effectively maintain said rigid cover in its raised position.

9. The vehicle as set forth in claim 8, wherein said vertical reinforcing members are substantially the same lateral dimension as said struts, and guide members secured to said vertical reinforcing members extending fore and aft of each said strut to afford lateral stability for said strut.

10. In a vehicle of the type described a wheel supported generally box-like trailer body comprising, wall structure defining the sides of said trailer body, a substantially rigid top member of a size to conform to the size in plan of the body formed by said wall structure and contoured to afford minimum wind resistance, pivotal mounting means disposed on opposite sides of said top member and spaced apart so as to be disposed toward the ends of said body sides, a rigid unitary and freely depending strut member pivoted at its upper end on each said mounting means, latch means disposed on each strut member intermediate its pivoted and depending free ends, said last mentioned latch means being spring biased outwardly from said strut member, said trailer body wall structure having vertically extending flange-like reinforcing members disposed adjacent said strut members, said spring biased latch means on said strut member engaging the upper edge of said trailer side wall structure as the rigid top member is raised upwardly at one end and away from said side wall structure, said strut-carried latch means constituting pivot means for said rigid cover as the other side of said cover is raised to effect engagement of the latch means on the side opposite said first-mentioned body side with the upper edge of said trailer wall structure, the said flange-like body-reinforcing members constituting abutment means for the free ends of said strut members to effectively maintain said rigid cover in its raised positon.

References Cited in the file of this patent

UNITED STATES PATENTS

| 1,216,986 | Habig | Feb. 20, 1917 |
| 1,476,051 | Cassell | Dec. 4, 1923 |
| 2,082,273 | Conkey | June 1, 1937 |
| 2,518,278 | Brumbaugh | Aug. 8, 1950 |
| 2,797,124 | Hauptli | June 25, 1957 |
| 2,853,338 | Stanley | Sept. 23, 1958 |

FOREIGN PATENTS

| 503,627 | Great Britain | Apr. 12, 1939 |